United States Patent [19]
Lee et al.

[11] Patent Number: 4,989,923
[45] Date of Patent: Feb. 5, 1991

[54] ABS REFERENCE SPEED DETERMINATION

[75] Inventors: Alan J. Lee, Farmington Hills; Philip M. Headley, Brighton, both of Mich.

[73] Assignees: General Motors Corporation, Detroit, Mich.; Delco Electronics Corporation, Kokomo, Ind.

[21] Appl. No.: 392,902

[22] Filed: Aug. 14, 1989

[51] Int. Cl.$^5$ .............................................. B60T 8/68
[52] U.S. Cl. ................................. 303/109; 188/181 C; 303/92; 303/96; 303/103; 364/426.02
[58] Field of Search ............... 303/109, 106, 107, 108, 303/105, 103, 111, 102, 94, 95, 96, 97, 92; 364/426.01, 426.02, 426.03; 188/181 C; 180/197

[56] References Cited
U.S. PATENT DOCUMENTS

| | | | |
|---|---|---|---|
| 4,484,280 | 11/1984 | Brugger et al. | 303/96 |
| 4,720,794 | 1/1988 | Skarvada | 303/109 X |
| 4,736,994 | 4/1988 | Fennel et al. | 303/111 |
| 4,760,893 | 8/1988 | Sigl et al. | 303/109 X |
| 4,762,375 | 8/1988 | Maki et al. | 303/96 |
| 4,787,682 | 11/1988 | Muto | 303/109 |
| 4,807,941 | 2/1989 | Onogi et al. | 303/108 |

Primary Examiner—Douglas C. Butler
Attorney, Agent, or Firm—H. N. Conkey

[57] ABSTRACT

A method for determining an accurate vehicle speed, based upon the wheel speed data, for vehicle antilock systems in which the integrity of each individual wheel speed value is verified before including that wheel speed value in the reference speed calculation. Reference speed is then computed as a function of only those wheel speed values which have been successfully accepted into the calculation.

8 Claims, 4 Drawing Sheets

ABS REFERENCE SPEED DETERMINATION

BACKGROUND OF THE INVENTION

This invention relates to vehicle antilock brake control systems, and more specifically to a system and method for determining a vehicle reference speed in an antilock control system.

Wheel slip is a measure of the relative difference between vehicle speed and the speed of the wheel, and is represented by the equation: $\lambda = (V-\omega)/v$ where $\lambda$ is wheel slip, $v$ is vehicle speed and $\omega$ is wheel speed. Antilock brake control systems typically use the parameter of wheel slip in determining when and whether to take corrective action. Since wheel slip is a measure of the relative difference between vehicle speed and wheel speed, any inaccuracies in the determination of vehicle reference speed will result in inaccuracies in the calculated wheel slip. These inaccuracies degrade overall system performance. Therefore, it is important that the ABS controller have an accurate measurement of vehicle reference speed.

Most vehicle antilock control systems, because the vehicle is equipped with a wheel speed sensor at each wheel, use all or some combination of the driven wheels and undriven wheels to arrive at the reference speed. When there is little or no wheel slip present at the wheels, most known vehicle reference calculations encounter little difficulty with accurately estimating the true vehicle body speed from the wheel speeds. For example, a simple average of the four wheel speeds will produce an accurate estimate of the vehicle speed under steady state driving conditions. Relatedly, using the highest of the wheel speed values as the reference speed value is also accurate under steady-state conditions. However, as wheel slip increases on one or more of the wheels, the accuracy of a vehicle reference speed created from either the simple average or based upon the highest wheel speed begins to degrade. This is because, as each wheel develops slip and begins to slow more rapidly than the true vehicle body speed, an average of these wheel speeds produces an estimated vehicle speed which is lower than the actual vehicle body speed. Relatedly, the wheel with the highest speed may itself be operating in the unstable braking region which also produces an artificially low estimate of vehicle reference speed. Similarly, if the wheels are traveling over a rough road surface, such as gravel, pot holes, or chatter bumps, or when there is an intermittent connector short in the wheel speed sensor causing an erratic signal, the variations experienced in the wheel speed signals corrupt the vehicle reference speed value. Thus, a system which produces a vehicle reference speed by taking a simple average of the four wheel speeds or by using the highest of the four wheel speeds does not have a reference velocity estimation method which is robust.

Various methods have been proposed to overcome the difficulties associated with producing a robust estimate of vehicle reference speed. Some of these proposed solutions involve the use of auxiliary devices, such as vehicle body accelerometers, wind speed detectors, fifth wheels, and the like. However, the use of such auxiliary devices proves impractical in mass vehicle production situations, due not only to the cost factors but to the difficulty in installing and maintaining these auxiliary devices.

Other proposed methods which rely solely on the wheel speed information involve imposing predetermined boundaries beyond which vehicle reference speed is calculated using means other than the individual wheel speeds. For example, many systems have been known to set a vehicle deceleration limit at 1.0 g. If, after calculating vehicle speed using the individual wheel speed data, the vehicle reference speed is more than 1.0 g less than the reference speed calculated during the previous control cycle, these systems discard the calculated reference speed value and instead impose a reference speed value which is 1.0 g less than the previous calculated reference speed value. This predetermined bounding process works well if the vehicle is operating on a road surface which physically allows a vehicle to decelerate at 1.0 g. However, many surfaces, such as gravel, snow, wet asphalt and ice, do not generate sufficient wheel/road tractive forces to decelerate the vehicle at such a high rate. In these instances, the maximum physically possible vehicle deceleration may be as low as 0.1 g. Given that, a large reference speed deceleration threshold causes the reference speed value to decelerate at a rate much higher than is physically possible for the vehicle under those road conditions, which results in an unrealistically low reference speed value which in turns causes unrealistically low wheel slip values. This can result in overbraking of the wheels, which manifests itself as longer periods of operation in the unstable braking region which reduces braking effectiveness and reduces vehicle stability.

Also, the known bounding methods are rather noise sensitive. Since bounding is performed only to prevent gross unnecessary deceleration of the reference speed, a wheel speed value which is unrealistically high due to rough road or an intermittent sensor connector causes reference speed to also be unrealistically high. This causes wheel slips to be unrealistically high, which results in under-braking. Under-braking manifests itself as longer periods of below-optimal braking, reducing braking effectiveness and increasing stopping distances.

It is plain to see that, in order to produce a robust vehicle reference speed value using only the wheel speed information, simply bounding the deceleration rate will not produce the desired accuracy when the full range of road conditions and hardware failures are considered.

Ideally, an antilock system's reference speed calculation should be rather easy to implement, embodying the convenience of taking a simple average of the four wheel speeds, while possessing the robustness of more complex configurations. It should resist unnecessary deceleration and noise corruption, and it should do so without having to rely upon external devices. Such a system would then be both inexpensive to deploy and versatile and accurate enough to satisfy the performance needs of a variety of vehicle braking applications.

SUMMARY OF THE INVENTION

The present invention discloses a system and method for producing a simple, yet robust, vehicle reference body speed. This reference speed is calculated by judicious use of the four wheel speeds where each wheel speed is checked to verify its integrity. If the wheel speed value has diverged significantly from a vehicle datum speed, or if the wheel acceleration signal is greater than an acceleration threshold (indicating the possibility of traveling over an extremely rough surface or having bad sensor connections), the system deems the wheel speed value to be unsatisfactory. The wheel speed value is excluded from the calculation until the wheel exhibits satisfactory behavior for at least two consecutive cycles. Each wheel's integrity is thus verified every control cycle before it is considered for use in the vehicle speed calculation. Even if a wheel successfully completes the integrity check, the wheel speed value is bounded on the low side by the minimum physically possible reference speed before being included in the reference speed calculation. Once the integrity checking routine is completed, an accurate estimate of vehicle speed can be calculated by simply averaging the accepted wheel speed values. Through this judicious selection of wheel speed data combined with deceleration threshold bounding, the subject inventive method produces a vehicle reference speed which is very accurate, immune to noise interference and simple to implement.

DESCRIPTION OF THE DRAWINGS

The advantages of the subject invention can be more fully understood by referencing the following description and drawings in which.

DESCRIPTION OF THE PREFERRED EMBODIMENT

Figure 1:
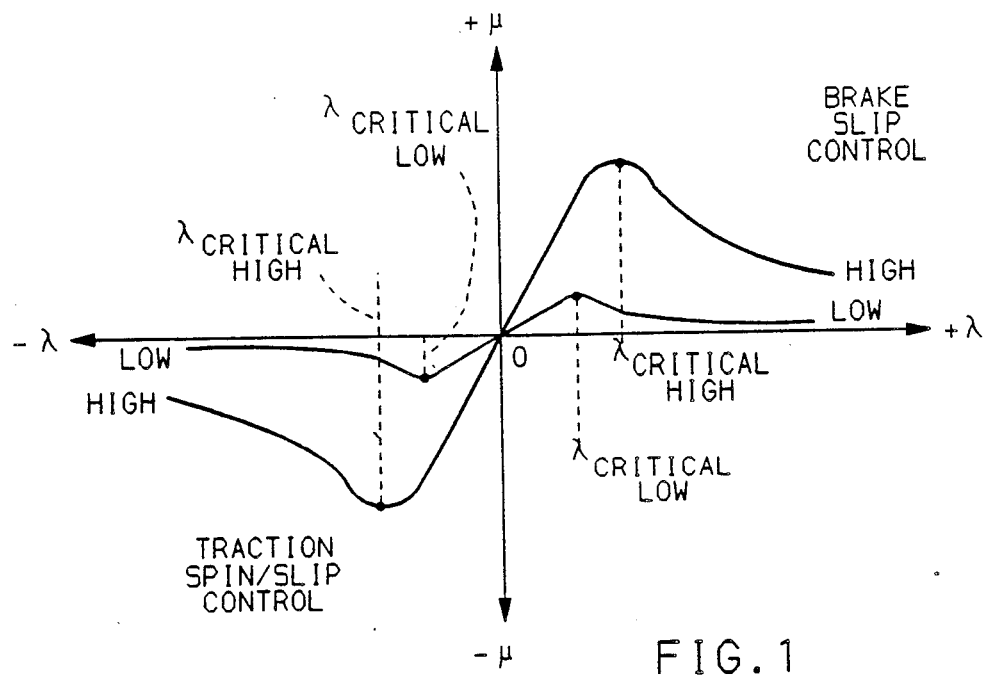
FIG. 1 is a diagram of the wheel slip characteristics of a wheel operating on a road surface.

FIG. 1 details the dynamics of the wheel and its interaction with the road surface. As can be seen from the graph, the wheel/road tractive force characteristic curve behaves in a similar manner whether in an acceleration or braking situation. As depicted on the curves labeled high and low, each surface has a unique critical slip value. This discussion deals solely with the first quadrant, which relates to antilock activities. In the region between the origin and the critical slip value, the tractive force between the wheel and the road surface increases. This region is referred to as the stable braking region. Beyond the critical slip value, the tractive force between the wheel and road surface decreases, and the wheel rapidly approaches lockup. This second region is referred to as the unstable braking region. Whenever the wheel enters the unstable region, corrective action must be taken to bring wheel slip back into the stable region. By doing so, the wheel/road tractive force is optimized. It is thus imperative that the antilock control system have an accurate measure of wheel slip, which, in turn, requires and accurate estimate of vehicle reference speed.

Figure 2:
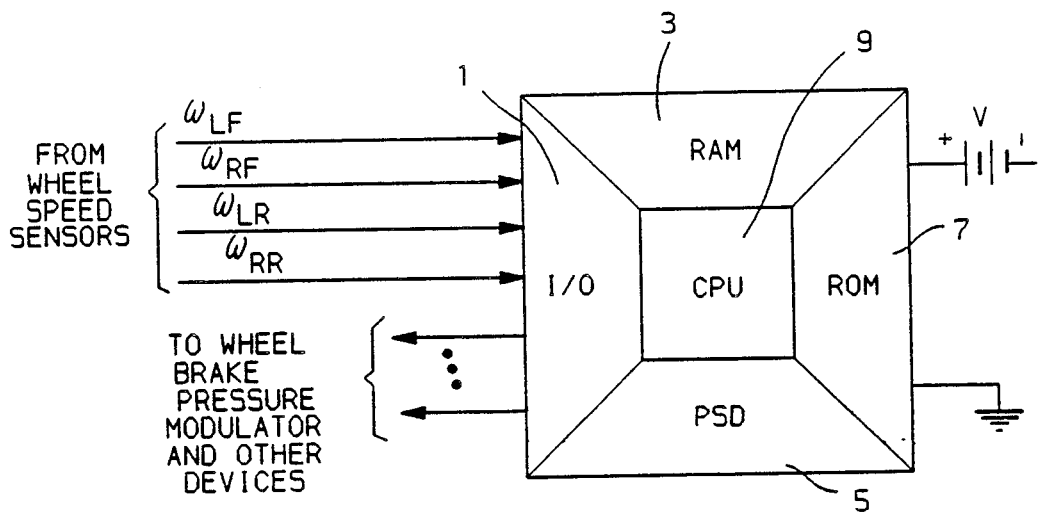
FIG. 2 is a diagram of a microcomputer which is used to implement the invention.

FIG. 2 diagrams a microcomputer which is used to implement the subject invention. Each of the vehicle wheels have a wheel speed sensor. The signals from these wheel speed sensors are fed into the microcomputer through the I/O 1. The I/O 1 serves as the interface between the microcomputer and any external devices. Emitting from the I/O 1 are control signal lines which go to the brake pressure modulator and other vehicle devices The microcomputer, in addition to the I/O 1, has: (a) random-access memory (RAM) 3 which is used to store calculation variables; (b) power supply device (PSD) 5 which interfaces the microcomputer to the vehicle power system; (c) read-only memory (ROM) 7 in which the instructions necessary to implement the invention are encoded; and (d) central processing unit (CPU) 9 which is the logic architecture that controls the operations of the microcomputer.

The microcomputer can be powered up via the vehicle ignition system or other convenient application-specific means. When the microcomputer is powered up, it begins executing the instructions encoded in ROM 7. It should be noted that, in describing the tasks necessary to implement this invention, the text in the flow chart function block <nn> broadly describe the details of each specific task as encoded in ROM. Through the exercise of ordinary skill in the art, one could employ a variety of information processing languages and/or circuit configurations to execute the tasks described by the text in function blocks <nn>.

Figure 3:
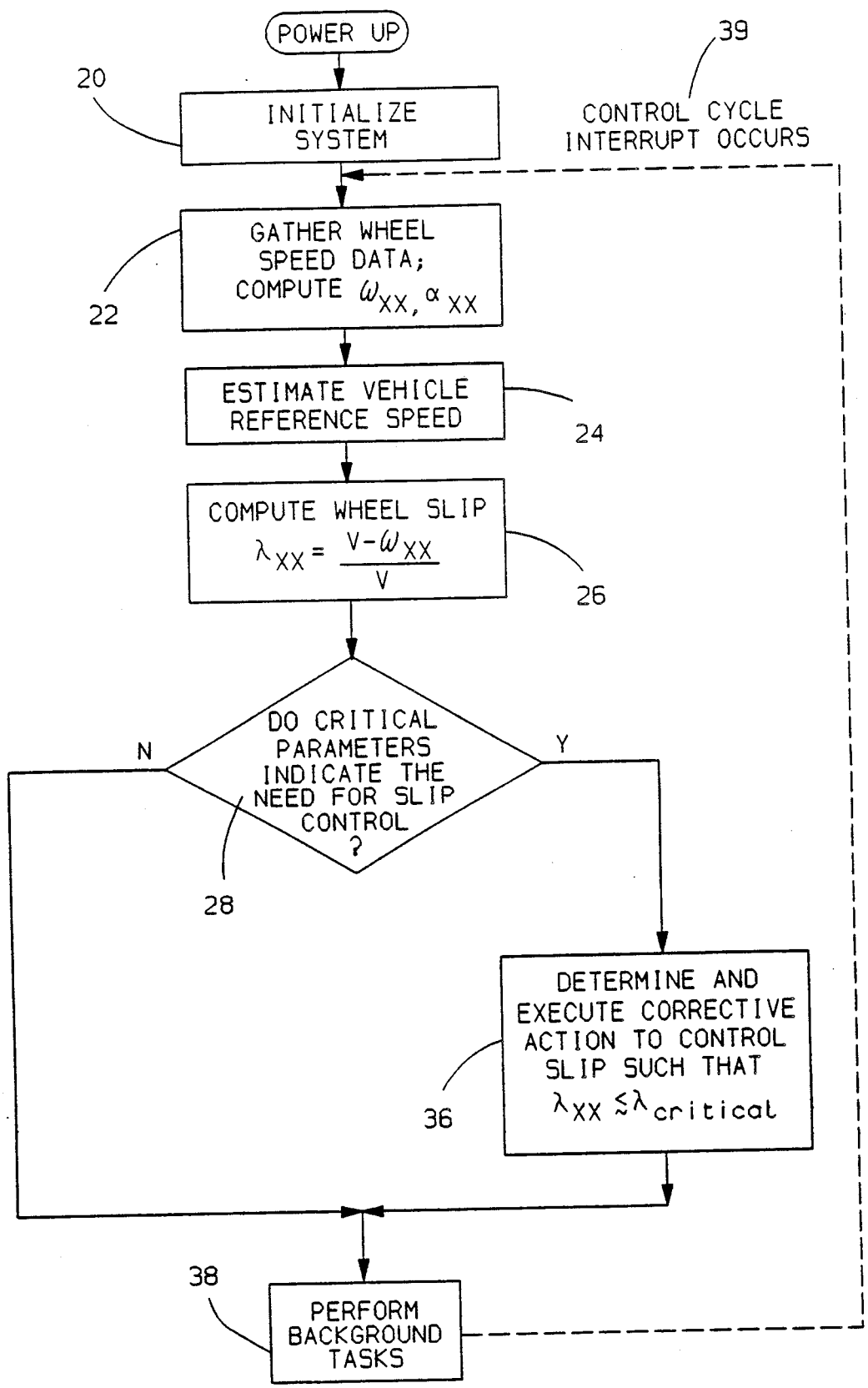
FIGS. 3, 4(a) and 4(b) are flow charts illustrating the tasks necessary to implement the subject invention.

As shown in FIG. 3, the first task executed after power up is the initialization of the system <20>. Initialization <20> entails the stabilizing of voltage levels at the I/O, initializing various RAM variables to calibrated values, and other basic functions of the microcomputer. Once done with initialization <20>, the microcomputer begins the control cycle. The control cycle contains instructions which are executed once during each of successive control cycles, such as once every five milliseconds. In this embodiment, the control cycle has been broadly described in function blocks <22> − <38>. Specifically, the first task of the control cycle is to read the wheel speed data and compute wheel speeds and wheel accelerations <22>. The next task of the control cycle is for the microcomputer to estimate the vehicle reference speed <24>. The estimation of the vehicle reference speed <24> will be discussed in greater detail later in this disclosure. Once the individual wheel speeds and the vehicle reference speed values have been computed (blocks <22> and <24>), the microcomputer calculates individual wheel slip values <26>. Now that the microcomputer has completed the calculation of the vehicle and wheel dynamic parameters, the next task is to determine whether these dynamic parameters indicate that antilock control is necessary <28>. For example, a high value of wheel slip is indicative of an incipient lock condition, and, as such, the microcomputer then recognizes this as a situation in need of corrective action.

If the critical wheel and vehicle dynamic parameters indicate a need for slip control <28>, the next task of the microcomputer is to determine and execute the proper corrective action such that wheel slip is controlled at or very near the critical slip value <36>. Thus, when measured wheel slip is greater than the critical wheel slip, the microcomputer commands the wheel brake pressure modulator to relieve pressure at the wheel brake allowing the wheel to recover from the incipient lock condition. Once the wheel has recovered from the incipient lock condition, the microcomputer commands the brake pressure modulator to increase pressure at the wheel brake. Such modulation of brake pressure helps ensure that the wheel is operating at or near the critical slip value, thereby maximizing vehicle braking efficiency. The microcomputer then proceeds on to perform the background tasks <38>.

If wheel slip control is not needed (block <28> false), the microcomputer simply proceeds on to perform the background tasks <38>, which can include: diagnostic test execution, off-board device communications and other ancillary tasks. The background tasks <38> are the last major functions of the control cycle. As related earlier, the control cycle is a series of tasks that are performed once during each of successive control cycles, such as once during every five milliseconds. When a new control cycle interrupt occurs <39>, the microcomputer begins executing the control cycle again. Thus, once during each control cycle, the microcomputer computes wheel speeds and wheel accelerations <22>, estimates vehicle reference speed <24>, computes wheel slip values <26> and determines whether or not these wheel and vehicle dynamic parameters indicate antilock control is necessary <28>. Depending on whether or not these parameters indicate wheel slip control is necessary, the microcomputer will, if slip control is needed, determine and execute the proper wheel brake pressure modulation such that wheel slip is operated at or near critical slip value <36>. Proceeding through to the execution of the background tasks <38>, the microcomputer finally prepares for the next control cycle, which begins with the occurrence of another control cycle interrupt <39>.

Figure 4A:
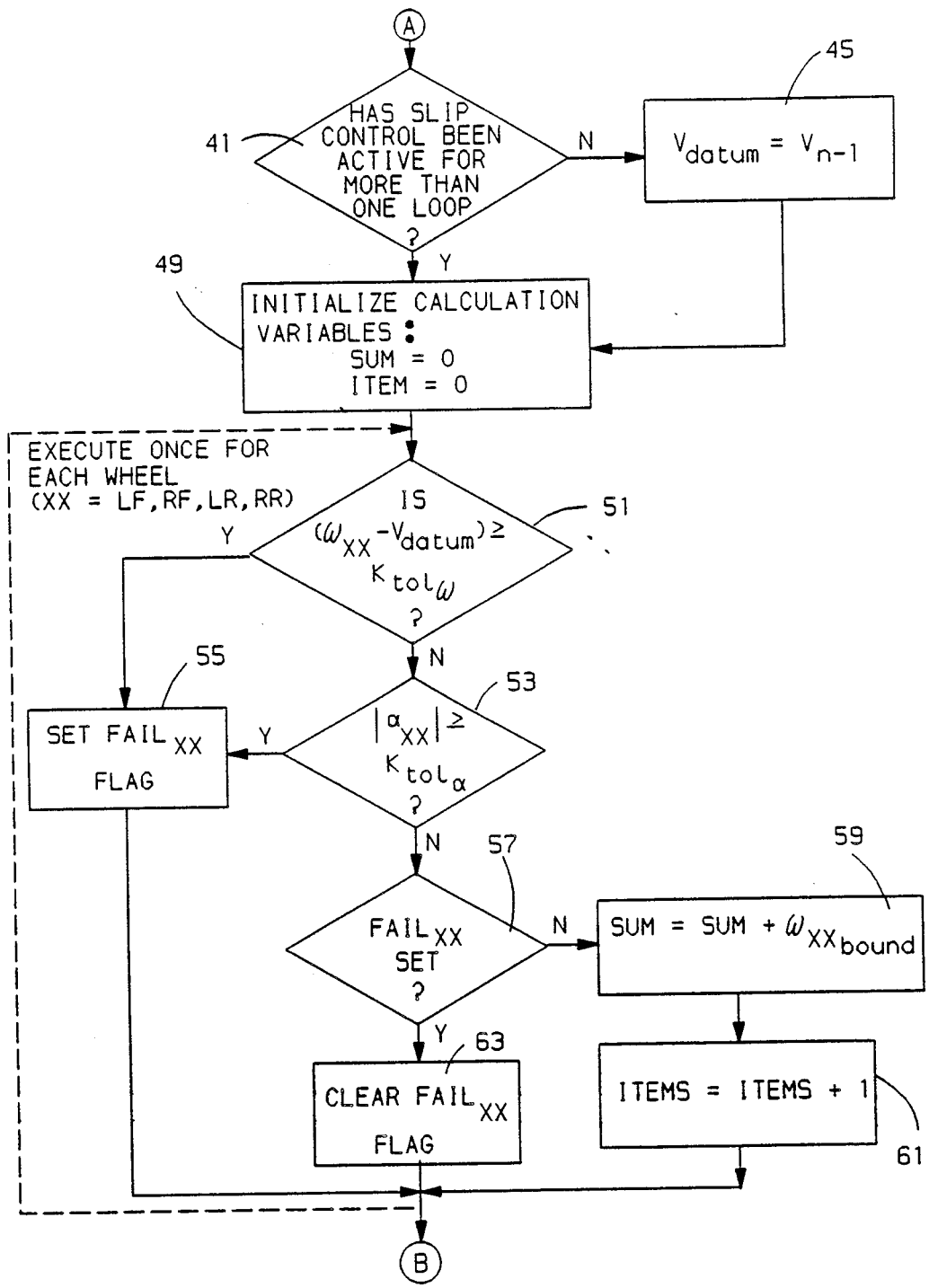
Figure 4B:
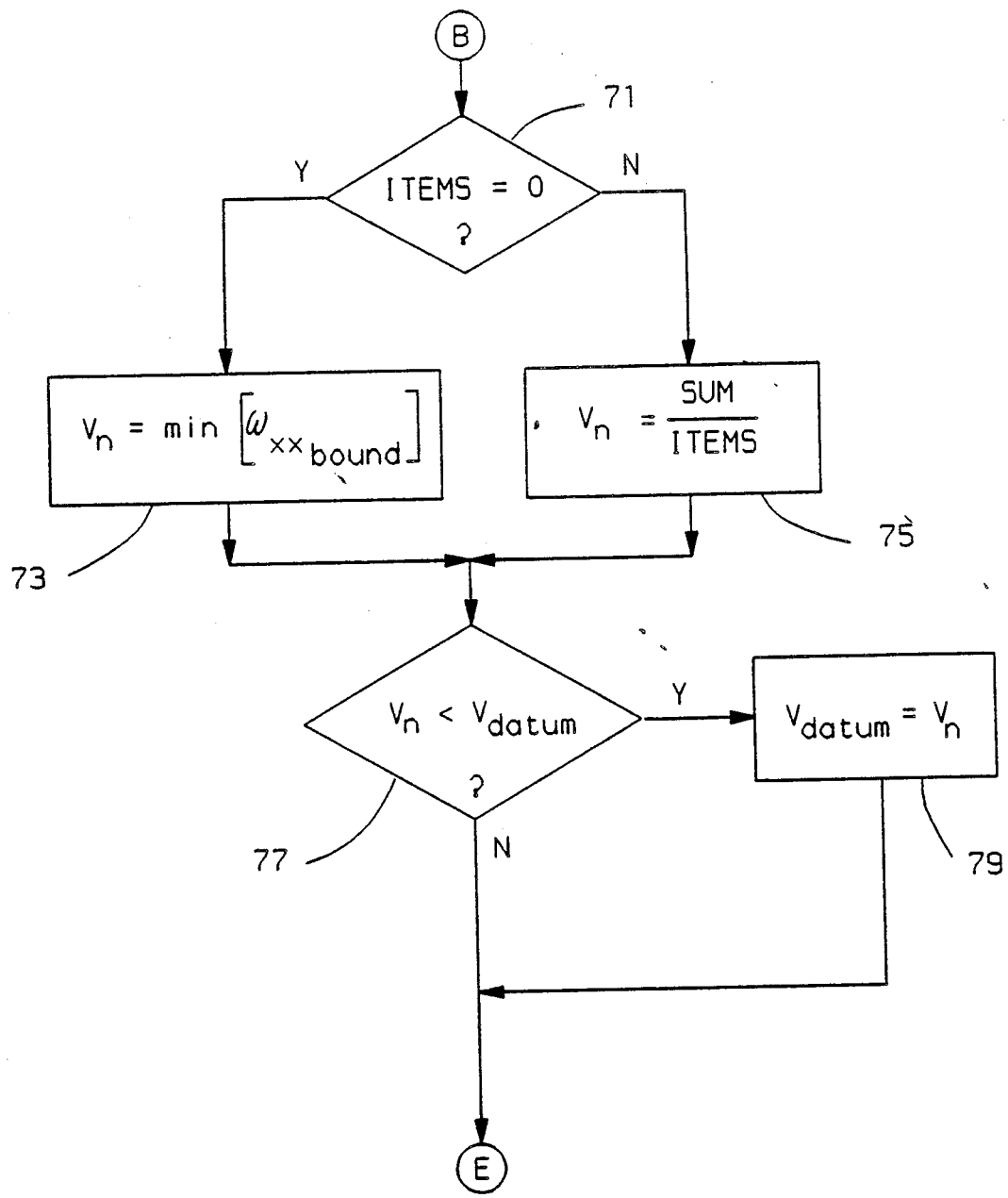

The estimation of vehicle reference speed <24> is described in greater detail FIG. 4. The first task of the microcomputer in the estimation of vehicle reference speed is determining whether or not antilock activities have been active for more than one full control cycle <41>. As related earlier, wheel slip control activities are initiated when the critical wheel and vehicle parameters indicate an incipient wheel lock condition is present. In the event of an incipient wheel lock, corrective action must be taken to insure that wheel slip is at or near the critical slip value. If antilock activities have not been initiated at all, or if this is the first full control cycle while wheel slip control activities are active, the microcomputer establishes the vehicle datum speed, $V_{datum}$, as being equal to the vehicle reference speed from the previous control cycle <45>. But, if wheel slip control is active and has been active for more than one full control cycle, the "first time in wheel slip control" test is failed, and the microcomputer leaves the vehicle datum speed unaffected. The microcomputer next initializes the reference speed calculation variables, SUM and ITEMS, <49>. These two variables represent the running total (SUM) and number of items in that running total (ITEMS) to be used in the calculation of vehicle reference speed, and will be described in greater detail later in this disclosure. Next, the microcomputer begins the integrity checking portion of the reference speed calculation, which is one of the key features to this invention.

The integrity checking portion is executed once for each of the wheels of the vehicle, and in this embodiment the execution follows in the order of left front wheel, right front wheel, left rear wheel, and finally right rear wheel. For the purposes of this discussion, all further references will be made in terms of the left front wheel. This is done with the full realization that the integrity checking routine is executed in identical fashion for each of the wheels of the vehicle, as indicated in FIG. 4.

The first task of the integrity checking portion is to determine whether the individual wheel speed has diverged from the vehicle datum speed by more a tolerance factor <51>. If the individual wheel speed, $\omega_{xx}$, has diverged from the vehicle datum speed, $V_{datum}$, by more than the speed tolerance factor, $K_{tol\omega}$, the microcomputer sets the "fail" flag for that particular wheel <55>. Therefore, if the left front wheel speed, $\omega_{lf}$, has diverged significantly from the vehicle datum speed (i.e. $\omega_{lf}$ is greater than the vehicle datum speed, $V_{datum}$, by more than the calibrated tolerance factor, $K_{tol\omega}$)<51>, the microcomputer sets the "fail" flag for the left front wheel <55> and exits the integrity checking portion of the routine. If, however, the left front wheel speed has not diverged significantly from the vehicle datum speed, the microcomputer simply moves on to the second portion of the wheel integrity check, where the acceleration of the wheel, $\alpha_{xx}$, is monitored to ensure it is within an acceleration tolerance range <53>. If the acceleration or deceleration of the left front wheel, $\alpha_{lf}$, is greater than the acceleration tolerance factor, $K_{tol\alpha}$, the microcomputer sets the "fail" flag for the left front wheel <55> and, again, exits the integrity checking portion of the routine. Thus, if the left front wheel fails either of the integrity checks, broadly categorized as (a) determining whether the wheel speed has diverged greatly from the vehicle datum speed and (b) monitoring the left front wheel acceleration to insure it is within an acceleration tolerance range, the left front wheel "fail" flag is set to indicate the wheel has failed the integrity checking portion, and the left front wheel speed is excluded from the summing section of the reference speed calculation.

If, however, the wheel successfully completes the first two portions integrity checking section of the reference speed determination routine (blocks <51> and <53> false), the next task of the microcomputer is to check the status of the "fail" flag <57>. If the "fail" flag is set (block <57> true), it must have been set during the prior control cycle. Given this, the microcomputer clears the "fail" flag <63> to indicate that the wheel has successfully completed the integrity check for the current control cycle but still excludes the wheel speed data from the summing section of the calculation.

Only those wheel speed values which successfully completed the integrity checks and are accepted into the summing portion are considered for inclusion in the reference speed calculation.

To restate, the wheel must exhibit satisfactory behavior for at least two consecutive control cycles—the current and the previous control cycle—before being considered for inclusion in the reference speed calculation. Therefore, if the "fail" flag is not set (block <57> true), the wheel successfully completed the prior control cycle's integrity checks as well as having successfully satisfied the current control cycle's integrity check, and the wheel is considered fit for inclusion in the reference speed calculation.

In summary, (a) if, during the current control cycle, the left front wheel fails either the speed variance <51> or acceleration tolerance <53> integrity checks, it is excluded from the reference speed calculation; (b) if the wheel successfully completes both of the integrity checks for the current control cycle but failed one of the checks during the previous control cycle such that the "fail" flag was set (blocks <51> false, <53> false, <57> (true), the "fail" flag is cleared to indicate successful completion of the current loop's integrity checks, but the wheel speed data is still excluded from the reference speed calculation; only if (c) the wheel successfully completed the current control cycle's and the previous control cycle's integrity checks (<51> false, <53> false, <57> false) will the wheel speed data be considered for inclusion in the reference speed calculation.

If the wheel speed data is a successful candidate for inclusion in the reference speed calculation, the microcomputer performs the summing portion of the reference speed determination routine. Here, the individual wheel speed value is "bounded" before being added to a running total <59>, the running total, SUM, containing the sum of all wheel speed values which have been properly accepted into the reference speed calculation. The bounded wheel speed is achieved by taking the individual wheel speed and bounding it on the low side by the minimum physically possible reference speed, $V_{min}$. The minimum physically possible reference speed is calculated by taking the previous control cycle's vehicle reference speed and decelerating it by a calibrated deceleration threshold: $V_{min} = V_{n-1} - \alpha_{cal}*t_c$ where $V_{min}$ is the minimum physically possible reference speed, $V_{n-1}$ is the previous control cycle's reference speed, $\alpha_{cal}$ is the calibrated deceleration threshold and $t_c$ the duration of the control cycle. The bounding of the wheel speed can be stated as the mathematical relationship: $\omega_{bound} = \max[\omega_{xx}, V_{min}]$ where $\omega_{bound}$ is the bounded wheel speed, $\omega_{xx}$ is the actual wheel speed where "xx" is the ordinal designation of that wheel (i.e. lf=left front, rr=right rear, etc.) and $V_{min}$ is the minimum physically possible reference speed. This prevent the unnecessary deceleration of the vehicle reference speed.

Next, the number of wheels which have been included in the reference calculation, ITEMS, is incremented <61>. Recall that the integrity checking and summing portions of the reference speed determination routine are performed once for each wheel during each of the successive control cycles. Therefore, the processes which have been described in terms of the left front wheel are executed once each control cycle for each of the vehicle wheels—left front, right front, left rear and right rear.

One of the key features of the invention lies in the integrity checking and summing portions of the reference speed determination routine. If the wheel speed ($\omega_{xx}$) has significantly diverged ($<K_{tol\omega}$) from the vehicle datum speed ($V_{datum}$), there exists a high degree of certainty that the wheel speed value has been corrupted and does not reflect normal wheel/road interaction. For example, a driven wheel can be raced by the engine, causing it to have an unusually high speed. Similarly, when a wheel is jarred by a pothole, it may spin as it becomes airborne. This being the case, the wheel speed data is excluded from the reference speed calculation so as to avoid unnecessarily biasing reference speed high. Relatedly, if the wheel acceleration ($\alpha_{xx}$) is greater than the acceleration tolerance threshold ($K_{tol\alpha}$), the wheel could be either (a) traveling over extremely rough road or (b) experiencing an intermittent speed sensor connector short or some other hardware failure at the wheel. This being the case, the wheel speed data is excluded from the calculation to prevent the corruption of the reference speed by noise. Only if the wheel speed has not significantly diverged from the vehicle datum speed (block <51> false) and the wheel acceleration is within the acceptable tolerance range (block <53> false) and the wheel did not fail either of these integrity checks during the previous control loop (block <57> false) is the wheel speed considered for inclusion in the reference speed calculation. Restated, the wheel must exhibit satisfactory behavior for a least two consecutive control cycles before being considered for inclusion in the reference speed calculation. Then, even once the wheel exhibits the required satisfactory behavior, the wheel speed value is not automatically accepted into the reference speed calculation. First, the wheel speed is bounded on the low side by the minimum possible reference speed, $V_{min}$. By bounding the wheel speed value before including it in the calculation, reference speed is prevented from being mathematically decelerated at a rate higher than is physically possible for the vehicle body. Only after the wheel speed has been properly bounded ($\omega_{bound}$) is it added to the running total (SUM) of wheel speed data <59>, this running total to be used for the calculation of vehicle reference speed. Finally, the number of wheels successfully included in the calculation (ITEMS) is updated <61>. Each of the wheels is processed through the integrity checking portion before the microcomputer continues on to the next major section of the reference speed determination routine.

Once the integrity checking and, if needed, the summing section, is performed on each of the wheels, the microcomputer continues on and calculates the vehicle reference speed. If the number of wheels that successfully completed the integrity checking portion (ITEMS) is zero, (block <71> true), the vehicle reference speed ($V_n$) is set equal to the minimum bounded wheel speed <73>. Recall that the bounded wheel speed, $\omega_{bound}$, is arrived at by taking the individual wheel speed, $\omega_{xx}$, and bounding it on the low side by the minimum physically possible reference speed $V_{min}$. Thus, if all wheels have failed the integrity checking portion of the routine, vehicle reference speed will be, at the minimum, the minimum physically possible reference speed.

However, if at least one of the wheels has successfully completed the reference speed integrity checking portion (block <71> fault), the vehicle reference speed is calculated as the simple average of the successfully completed wheel speeds <75>. For example, if three wheels successfully complete the integrity checking portion, then the vehicle reference speed is the sum of those three wheel speeds divided by three. This can be represented by the mathematical expression: $V_n = 1/N*[\Sigma(\omega_{bound})]$ where $V_n$ is the vehicle reference speed as calculated during the current control cycle, N is ITEMS, the number of wheel speed values which were successfully accepted and bounded, and $\Sigma\omega_{bound}$ is SUM, the running total of the successfully accepted and bounded individual wheel speeds. Once the vehicle reference speed value is determined, the microcomputer determines whether or not to update the vehicle datum speed value. If the current vehicle reference speed is less than the previously stored vehicle datum speed (block <77> true), vehicle datum speed is simply set equal to the vehicle reference speed <79>.

It can be seen that the process of first checking each individual wheel for its integrity before considering it for inclusion in the calculation and then bounding each successfully accepted wheel speed by the minimum physically possible reference speed creates an estimate of vehicle reference speed which is much more immune to various forms of data corruption than other known methods. Once during each control cycle, the microcomputer integrity checks each of the wheels and includes only those wheel speed values which exhibit satisfactory behavior. The first integrity check compares the wheel speed to a vehicle datum speed, and generates a failure flag if there is excessive divergence. The second integrity check monitors wheel acceleration and generates the failure flag if the wheel acceleration/deceleration is greater than a tolerance threshold. The wheel speed value is excluded both when a failure flag is generated during the current control cycle and when a failure flag exists from the previous control cycle. Even if a wheel successfully completes the integrity checks, it is bounded on the low side by the minimum physically possible reference speed. This entire process prevents vehicle reference speed from (a) being biased unnecessarily high by a racing or airborne wheel, (b) being corrupted by noise due to erratic wheel acceleration behavior and (c) being mathematically decelerated at a rate higher than is physically possible for the vehicle body. After checking each wheel, excluding the unsatisfactory wheels and including the properly bounded satisfactory wheels in the reference speed summing calculation, the microcomputer calculates vehicle reference speed to be the simply average of the accepted wheel speeds. If none of the wheels were acceptable, the vehicle reference speed is set equal to the minimum of the bounded wheel speeds. In all cases, this will result in reference speed being, at the minimum, the minimum physically possible reference speed, $V_{min}$. However, if at least one wheel was accepted, the vehicle reference speed is set equal to the sum of the accepted wheel speeds (SUM) divided by the number of accepted wheel speeds (ITEMS) Thus, another advantage to this invention is that the reference speed calculation is flexible and adapts to accommodate only those wheel speed values that have successfully been accepted into the calculation.

The foregoing description of a preferred embodiment and the accompanying drawings should not be construed to limit to invention in any manner, as one could, through the use of ordinary skill in the art, modify this invention without departing from its scope.

The embodiments of the invention in which an exclusive property or privilege is claimed are defined as follows:

1. A system for determining a vehicle reference speed value for the purposes of wheel lock control for a vehicle having a plurality of wheels, the system comprising in combination:
    means for measuring a value of speed for each of the vehicle wheels;
    means for (a) comparing predetermined parameters of each wheel with predetermined limits and (b) selecting the wheel speed values of the wheels whose parameters are within the predetermined limits; and
    means for determining an average of the selected wheel speed values, the average of the selected wheel speed values comprising the vehicle reference speed.

2. The system of claim 1 wherein the predetermined parameters of each wheel include the rate of change in the wheel speed value.

3. The system of claim 2 further including means for setting a vehicle datum speed at the determined average of the selected wheel speed values and wherein the predetermined parameters of each wheel include the deviation of the wheel speed value from the vehicle datum speed.

4. A method for determining a vehicle reference speed during antilock controlled braking of a vehicle having a plurality of braked wheels, the method comprising, in combination, the steps of:
    establishing a calculation interval;
    measuring a speed value for each wheel during the calculation interval;
    comparing predetermined parameters of each wheel with predetermined limits and selecting the speed values of those wheels whose parameters are within the predetermined limits;
    determining a minimum reference speed value which reflects a maximum allowable decrease in the vehicle reference speed value during a calculation interval;
    determining a bounded selected speed value for each of the speed values selected during each calculation interval in accordance with the expression $\omega_{bound} = \max[\omega, V_{min}]$ wherein $\omega$ is the speed value selected, $V_{min}$ is the determined minimum reference speed and $\max[\omega, V_{min}]$ indicates that the greater of these two values be used; and
    determining the average of the bounded selected speed values during each calculation interval, the average of the bounded selected speed values comprising the vehicle reference speed.

5. The method of claim 4 further including the steps of:
    determining a bounded unselected speed value for each of the speed values not selected during each calculation interval in accordance with the expression $\omega_{bound} = \max[\omega, V_{min}]$ wherein $\omega$ is the speed value not selected, $V_{min}$ is the determined minimum reference speed and $\max[\omega, V_{min}]$ indicates that the greater of these two values be used; and
    setting the vehicle reference speed in each calculation interval in which there were no selected speed values at the minimum of the bounded unselected speed values.

6. The method of claim 5 wherein the predetermined parameters of each wheel include the rate of change in the wheel speed value.

7. The method of claim 6 wherein the predetermined parameters of each wheel include the deviation of the wheel speed value from a vehicle datum speed during the calculation interval wherein the vehicle datum speed is set at the vehicle reference speed value when (a) antilock controlled braking is inactive, or when (b) antilock controlled braking had been inactive prior to the calculation interval but is now active for the calculation interval, or when (c) the vehicle datum speed exceeds the vehicle reference speed value.

8. A method of claim 7 wherein the comparison of predetermined parameters of each wheel with predetermined limits and selecting of the speed values of those wheels whose parameters are within predetermined limits includes a failure condition associated with a given wheel which is generated when (a) the wheel speed value exceeds the vehicle datum speed by more than a calibrated speed threshold or when (b) the rate of change of wheel speed of the wheel exceeds a calibrated acceleration threshold such that only those wheel speed values associated with the wheels that have not had a failure condition associated therewith for at least two consecutive calculation intervals are selected.

* * * * *